(12) United States Patent
Steel

(10) Patent No.: US 8,090,357 B2
(45) Date of Patent: Jan. 3, 2012

(54) METHOD OF DISTRIBUTING THE LOCATION DATA OF A MOBILE DEVICE

(75) Inventor: Christopher G. Steel, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 644 days.

(21) Appl. No.: 10/535,327

(22) PCT Filed: Nov. 7, 2003

(86) PCT No.: PCT/IB03/05055
§ 371 (c)(1),
(2), (4) Date: Feb. 6, 2006

(87) PCT Pub. No.: WO2004/047477
PCT Pub. Date: Jun. 3, 2004

(65) Prior Publication Data
US 2006/0173612 A1 Aug. 3, 2006

(30) Foreign Application Priority Data
Nov. 20, 2002 (GB) .................................. 0227027.0

(51) Int. Cl.
*H04M 3/42* (2006.01)
(52) U.S. Cl. .................. 455/414.2; 455/456.1; 455/411; 455/412.1; 455/414.3; 455/457; 701/207
(58) Field of Classification Search .................. 455/410, 455/411, 456.1, 457, 414.3, 456.3, 412.2; 701/207
See application file for complete search history.

(56) References Cited

U.S. PATENT DOCUMENTS

| 5,978,693 | A | 11/1999 | Hamilton et al. | |
|---|---|---|---|---|
| 7,013,391 | B2 * | 3/2006 | Herle et al. | .................... 713/182 |
| 2001/0044309 | A1 | 11/2001 | Bar | |
| 2001/0044311 | A1 | 11/2001 | Larsson et al. | |
| 2003/0211842 | A1 * | 11/2003 | Kempf et al. | ................. 455/411 |

FOREIGN PATENT DOCUMENTS

| FR | 2736789 A1 | 7/1995 |
|---|---|---|
| JP | 2001148735 A | 5/2001 |
| WO | 0070504 A2 | 11/2000 |
| WO | WO 00/70504 A2 | 11/2000 |
| WO | 0249380 A1 | 6/2002 |

OTHER PUBLICATIONS

Stallings, Williams: Data and Computer Communication, Network Security, Chapter 18, 1997, pp. 634-637, XP-002268611.

* cited by examiner

*Primary Examiner* — Dwayne Bost
*Assistant Examiner* — Amancio Gonzalez

(57) ABSTRACT

A method of distributing the location of a mobile device is disclosed together with a mobile device, a server and a remote terminal for the same. The method comprising the steps of determining the location of the mobile device; encrypting the determined location using an encryption key; transmitting the encrypted location to a server; storing the encrypted at the server; querying the server from a remote terminal; transmitting from the server to the remote terminal the encrypted location in response to the query; sharing the predetermined encryption key between the mobile device and the remote terminal but not with the server; and decrypting the location at the remote terminal using the predetermined encryption key.

4 Claims, 2 Drawing Sheets

METHOD OF DISTRIBUTING THE LOCATION DATA OF A MOBILE DEVICE

The invention relates to a method of distributing the location of a mobile device together with a mobile device, server and terminal for the same.

U.S. patent application, publication number US2001/0044309 discloses an "Internet distributed real-time wireless location database" for "distributing real time location information of cellular telephone users to various third party information subscribers using an HTTP server machine which maintains a dynamic database of current cellular users. The database has a list of caller entries, where each entry typically comprises a user ID number, such as a phone number, mobile ID number, and/or handset serial ID. The entry also includes, for each user ID number, a user location identifier such as a latitude and longitude, a sector number, a caller or called phone number and/or a street address. The HTTP server is connected to the internet so that registered third party information subscribers have access to the database by means of standard HTTP protocols that ensure authentication and provide encryption for security. Using caller ID or other means for obtaining a caller's phone number, the third party subscriber can obtain, via a simple internet query, the current location of the caller by submitting the phone number to the HTTP server using an HTML form. Software on the central server machine verifies the authenticity of the subscriber, looks up the location information in the database, and returns the information to the subscriber. The subscriber can then use the location information to provide any of a wide range of services to the caller, or to dispatch emergency vehicles to the location of the caller. In addition, the server can directly provide many location-based services to callers."

It is the object of the invention to provide a method of distributing the location of a mobile device which safeguards the privacy of the user of the mobile device.

In accordance with the present invention, such a method comprises the steps of determining the location of the mobile device; encrypting the determined location using an encryption key; transmitting the encrypted location to a server; storing the encrypted location at the server; querying the server from a remote terminal; transmitting from the server to the remote terminal the encrypted location in response to the query; sharing the encryption key between the mobile device and the remote terminal but not with the server; and decrypting the location at the remote terminal using the encryption key.

Such a method enables a server to support such distribution of location information in a manner in which the server and/or entity operating the server is unable to decrypt the location information to determine the movements of the user of the mobile device.

Also provided in accordance with the present invention is a corresponding mobile device, server and terminal as claimed in claims 2 to 4.

The present invention will now be described, by way of example only, with reference to the accompanying schematic drawings in which.

Figure 1:
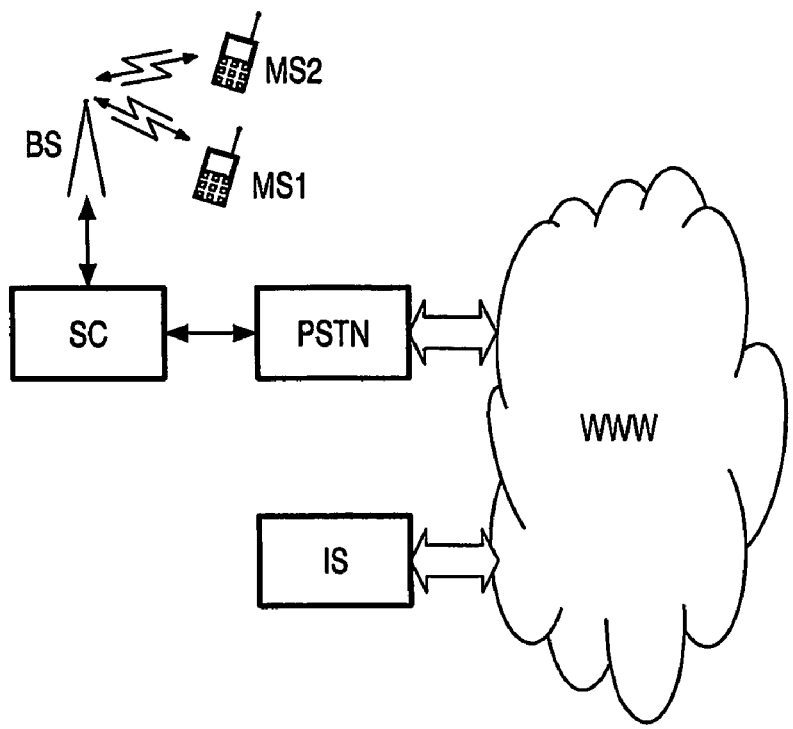
FIG. 1 shows identical mobile cellular telephones MS1 and MS2 communicating via respective nearby cellular telephone network base station BS and a public switched telephone network (PSTN) with a remote, Internet based information server (IS) in accordance with the present invention.

FIG. 1 shows identical mobile cellular telephones MS1 and MS2 in possession of respective users (not shown) and registered with nearby cellular telephone network base station BS facilitating voice and data communication via the base station and the system controller (SC) of a corresponding cellular telephone network. Data communication is intended to include sending text messages (for example using the short message service (SMS) protocol) and accessing the Internet (for example using WAP or i-mode protocols). In particular, mobile telephones MS1 and MS2 are communicating via their respective base station and a public switched telephone network PSTN with a remote, Internet based information server IS in a manner according to the present invention.

Figure 2:
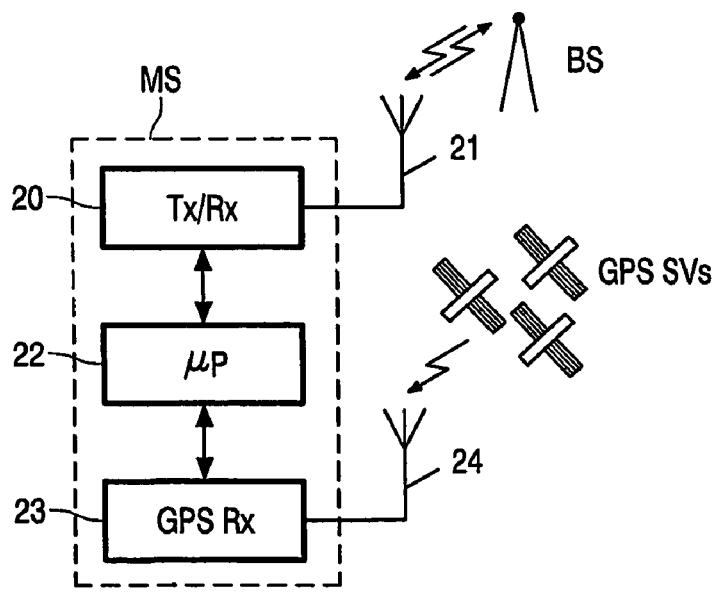
FIG. 2 shows mobile cellular telephones MS1 and MS2 of FIG. 1 in greater detail.

In FIG. 2, telephones MS1 and MS2 are shown in greater detail, each comprising a communications transmitter (Tx) and receiver (Rx) 20 connected to a communications antenna 21 and controlled by a communications microprocessor (μp) 22 for communication with the base station BS with which it is registered. Telephones MS1 and MS2 each further comprise a GPS receiver (GPS Rx) 23 connected to a GPS antenna 24. Also, the communications microprocessor (μp) 22 is further configured to acquire and track GPS signals for the purpose of deriving pseudorange information from which the location of the mobile telephone can be determined using conventional navigation algorithms. Such methods for GPS signal acquisition, tracking and position determination are well known, for example, from GPS Principles and Applications (Editor, Kaplan) ISBN 0-89006-793-7 Artech House. Also, the design and manufacture of telephones of the type of telephones MS1 and MS2 are well known and those parts which do not directly relate to the present invention will not be elaborated upon here further.

Figure 3:
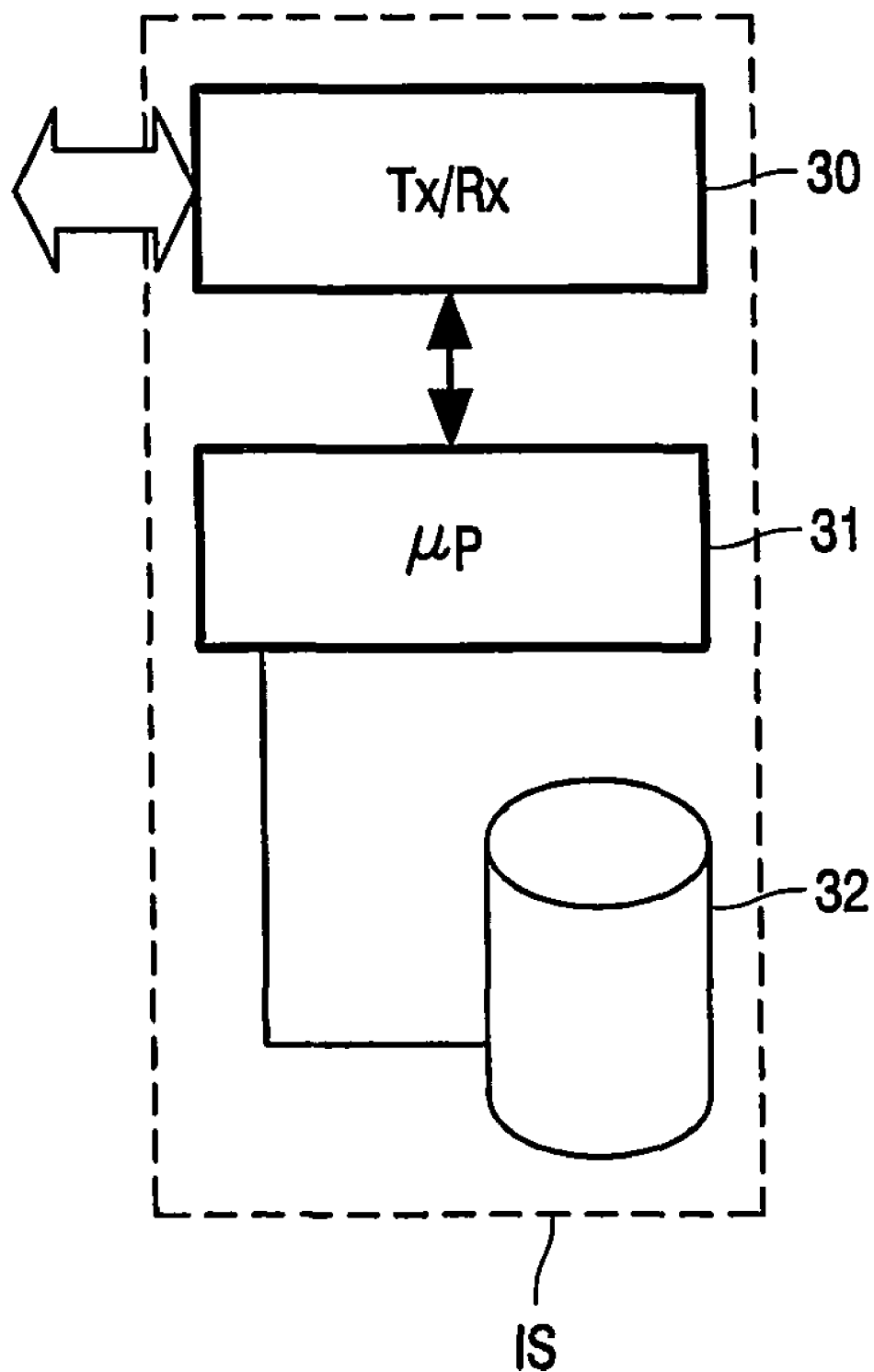
FIG. 3 shows the remote, Internet based information server (IS) of FIG. 1 in greater detail.

FIG. 3 shows the remote, Internet based information server IS in greater detail. As illustrated, the server is arranged to receive, and deliver, signals to the Internet and includes a transmitter (Tx) and receiver (Rx) 30 for receiving information and queries from mobile telephones MS1 and MS2. In particular, the server supports a database 32 under control of a microprocessor (μp) 31 wherein the database's records containing information about the locations of mobile telephones MS1 and MS2 supplied to the database by the microprocessor.

The server may be queried in accordance with the present invention as illustrated in the following example scenario.

Suppose that a user in possession of telephone MS1 has received a text message from a friend, the user of telephone MS2, with whom the user is intending to meet and appended to that text message is an encryption key.

Further suppose that a record relating to the location of telephone MS2 is maintained in the database held on the information server IS, the record including the number of telephone MS2 and an encrypted location of telephone MS2 previously determined and encrypted at telephone MS2 and uploaded to the database.

The user of telephone MS1 connects to the Internet using their mobile cellular telephone in a conventional manner by transmitting and receiving data from the telephone MS1 via the base station BS1, a cellular network system controller (SC) and a public switched telephone network PSTN. The user then accesses the information server (IS) via the Internet and queries the database held on the information server by sending the telephone number of telephone MS2 to the information server. The information server (IS) replies sending the encrypted location.

Upon receiving the encrypted location, telephone MS1 decrypts the encrypted location of telephone MS2 using the encryption key previously appended to the text message sent by telephone MS2. Telephone MS1 then generates an url to a mapping website and connects to that url to display to the user of telephone MS1 a map of the location where telephone MS2 is located. Thus, the user of telephone MS1 has been able to determine the location of telephone MS2 without a third party being able to do the same.

At the time of writing, the mapping website http://www.multimap.co.uk enables an url to be created which if selected directs a user to a map of a predefined area. Similarly, the same website will also provide directions from one location to another and accordingly, the mechanisms for this functionality are not described here in detail.

As an alternative to a GPS receiver above, other forms of positioning technology may be used including telephone network positioning such as E-OTD and other GPS type solutions such as GLONASS and GALILEO.

From reading the present disclosure, other modifications will be apparent to persons skilled in the art. Such modifications may involve other features which are already known in the design and use of computer systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of distributing the location of a mobile device comprising the steps of:
   the mobile device determining its location;
   the mobile device encrypting its determined location using a predetermined encryption key; and
   the mobile device uploading the encrypted location and a telephone number of the mobile device to a server for storage as a record associated with the mobile device;
   the mobile device communicating with a remote terminal, including sharing the predetermined encryption key with the remote terminal by attaching the encryption key to the communication, wherein the encryption key is not shared with the server; and
   the remote terminal querying a database supported by the server by sending the telephone number of the mobile device in response to receiving the communication from the mobile device;
   the server transmitting to the remote terminal the encrypted location of the mobile device in response to the query;
   the remote terminal decrypting the encrypted location of the mobile device using the predetermined encryption key received from the mobile device.

2. A mobile device comprising:
   a communications transmitter for transmitting a query to a remote server requesting the location of a mobile device, said query being made in response to receiving a communication from another mobile device with which the mobile device has shared an encryption key;
   a communications receiver coupled to a communications antenna for:
      i. receiving encrypted location information from the remote server in response to said transmitted query to the remote server;
      ii. receiving a communication from said another mobile device with which it has shared an encryption key independently of the remote server;
   a GPS receiver for determining a location of the mobile device;
   a communications microprocessor for controlling the communications transmitter and communications receiver, said microprocessor performing functions including:
      i. encrypting the GPS determined location of the mobile device using an encryption key not shared with the remote server;
      ii. sharing the predetermined encryption key with said another mobile device by attaching the encryption key to a communication between the mobile device and said another mobile device, wherein the encryption key is not snared with the remote sever;
      iii. decrypting the location information from the remote server upon receipt of said encrypted location information, wherein said encrypted location is encrypted with the encryption key not shared with the remote server.

3. The mobile device of claim 2, wherein the transmitted query is transmitted to a database associated with the remote sever.

4. The mobile device of claim 2, wherein the encrypted location information is received from the remote sever without authenticating the query.

* * * * *